Aug. 1, 1933.                C. H. ZIERDT                 1,920,618
                       VOLTAGE REGULATING APPARATUS
                       Original Filed Oct. 12, 1928

INVENTOR:
C. H. Zierdt,
BY
his ATTORNEY.

Patented Aug. 1, 1933

1,920,618

UNITED STATES PATENT OFFICE 1,920,618

VOLTAGE REGULATING APPARATUS

Conrad H. Zierdt, Rosedale, Penn Township, Allegheny County, Pa., assignor to The Union Switch & Signal Company, Swissvale, Pa., a Corporation of Pennsylvania Original application October 12, 1928, Serial No. 312,048. Divided and this application October 25, 1930. Serial No. 491,197

1 Claim. (Cl. 171—119)

My invention relates to voltage regulating apparatus, that is, apparatus for use between a source of energy and an energy consuming device for regulating the voltage applied to said device.

The present application is a division of my copending application filed Oct. 12, 1928, Serial No. 312,048, for Voltage regulating apparatus.

I will describe two forms of apparatus embodying my invention, and will then point out the novel features thereof in the claim.

Figure 1:
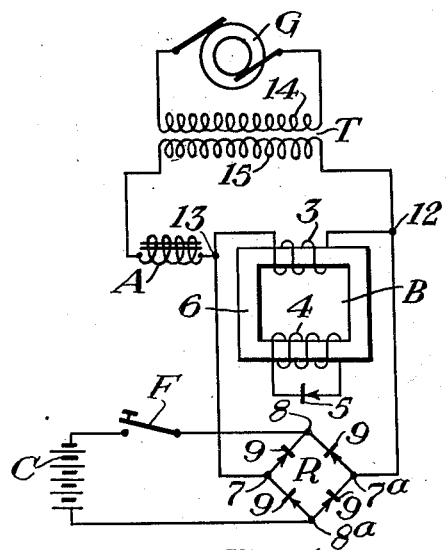
Figure 2:
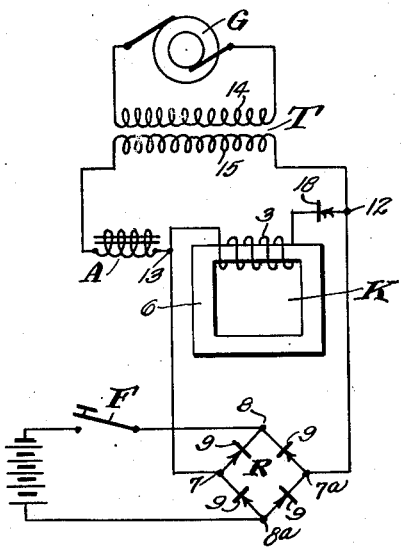

In the accompanying drawing, Fig. 1 is a diagrammatic view showing one form of voltage regulating apparatus embodying my invention applied to a storage battery charging circuit. Fig. 2 is a diagrammatic view showing a modified form of voltage regulating apparatus also embodying my invention.

Similar reference characters refer to similar parts in each of the views.

Referring first to Fig. 1, the reference character T designates a transformer, the primary 14 of which is connected with a suitable source of alternating current here shown as an alternator G. The secondary 15 of transformer T is connected, through a current limiting impedance A, with the input terminals 7 and 7ª of a rectifier R comprising a plurality of asymmetric units 9 connected in the usual manner to provide full wave rectification. The output terminals 8 and 8ª of rectifier R are connected through a switch F with a storage battery C which is to be charged by the unidirectional current delivered by the rectifier.

With the apparatus constructed in the manner thus far described, under normal conditions, that is, when switch F is closed, current from the secondary 15 of transformer T is supplied to battery C through rectifier R, and the parts are so proportioned that this current upon flowing through the impedance A creates a potential drop in the impedance which maintains the voltage impressed across the input terminals 7 and 7ª of rectifier R at a value which is slightly higher than the terminal voltage of storage battery C. The impedance A is so constructed that its flux density in response to this normal current, is comparatively low. The reactance of A is therefore substantially constant through a wide range of variations in the current. If, now, switch F is opened, the current flowing in impedance A is greatly diminished, so that the potential drop across the impedance is also greatly diminished, and if the voltage of the secondary 15 of transformer T is constant, the voltage impressed across the input terminals of rectifier R rises. This rise in voltage in some instances may be sufficiently great to damage the rectifier R. To prevent this undesirable rise in voltage, I provide a reactor B comprising a closed iron core 6 carrying a primary winding 3 and a secondary winding 4. The terminals 12 and 13 of the primary winding 3 of reactor B are connected with the input terminals 7ª and 7, respectively of rectifier R. An asymmetric unit 5 is connected directly across the secondary winding 4 of reactor B.

It is apparent that the voltage impressed across input terminals 7ª and 7 of rectifier R is also impressed across terminals 12 and 13 of winding 3 of reactor B. An alternating current therefore flows in winding 3, and an alternating flux is set up in core 6. This alternating flux in core 6 tends to induce an alternating electromotive force in winding 4 of reactor B, but since asymmetric unit 5 is connected in series with winding 4, a unidirectional current flows in winding 4 which creates an unidirectional flux in core 6 in addition to the alternating flux created in core 6 by the alternating current in winding 3. The parts of reactor B are so proportioned that under normal conditions, that is, when switch F is closed, the flux density in the core 6 is near saturation. If, now, the voltage impressed upon rectifier R tends to rise for any reason, such as the opening of switch F, the current flowing in winding 3 of reactor B increases, so that the flux density in core 6 increases, and the impedance of winding 3 therefore decreases. Since winding 4 and rectifier 5 cooperate to create a unidirectional flux in core 6, as has already been described, the decrease in impedance of winding 3 due to a given rise in the voltage applied to its terminals is greater than would be the case if winding 4 and rectifier 5 were omitted. As a result of this decrease in the impedance of winding 3, the current through the winding is still further increased. But the increased current in winding 3 causes an increase in the potential drop across impedance A, with the final result that the voltage applied to terminals 7 and 7ª of rectifier R when switch F is opened is considerably smaller than would be the case if reactor B were not provided. By properly designing the reactor B and the impedance A, the voltage across the terminals of rectifier R may be made substantially constant.

In the modification shown in Fig. 2, an asymmetric unit 18 is connected in series with the winding 3 of an iron core reactor K so that the current flowing in winding 3 is unidirectional current. The reactor K is so designed that when normal voltage is impressed across terminals 12 and 13 of winding 3, the flux density in core 6 is near saturation. I have found that with the reactor constructed in this manner, since the flux in core 6 is a unidirectional flux, the decrease in impedance in winding 3 for a given rise in voltage at terminals 12 and 13 is considerably greater than the decrease in impedance in the winding of a similar reactor not having the asymmetric unit in series with the winding. This effect may further be increased by using an asymmetric unit 18 of the type comprising a copper disk having a coating of cuprous oxide formed on one side thereof. A unit of this type exhibits the characteristics of decreasing its resistance with increases in the electromotive force applied across the unit. The apparatus of Fig. 2, as a whole, functions in the manner previously described in connection with Fig. 1.

Although I have herein shown and described only two forms of voltage regulating apparatus embodying my invention, it is understood that various changes and modifications may be made therein within the scope of the appended claim without departing from the spirit and scope of my invention.

Having thus described my invention, what I claim is:

Voltage regulating apparatus for use with a source of alternating current connected with a load and an impedance interposed between the two, comprising, in combination with the foregoing elements, a reactor having an iron core provided with only a single winding the whole of which is connected in multiple with said load, and an asymmetric unit of the copper oxide type included in series with said windings, the parts of said apparatus being so proportioned that when normal voltage is applied to the load the flux density in said core is near saturation.

CONRAD H. ZIERDT.